(12) United States Patent
Matsumoto et al.

(10) Patent No.: US 9,695,488 B2
(45) Date of Patent: Jul. 4, 2017

(54) STEEL FOR BOLT USE, BOLT, AND METHOD FOR MANUFACTURING BOLT

(71) Applicant: Kobe Steel, Ltd., Kobe-shi (JP)

(72) Inventors: Yosuke Matsumoto, Kobe (JP); Atsushi Inada, Kobe (JP); Masamichi Chiba, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 187 days.

(21) Appl. No.: 14/370,814

(22) PCT Filed: Nov. 26, 2012

(86) PCT No.: PCT/JP2012/080440
§ 371 (c)(1),
(2) Date: Jul. 7, 2014

(87) PCT Pub. No.: WO2013/105344
PCT Pub. Date: Jul. 18, 2013

(65) Prior Publication Data
US 2015/0003935 A1 Jan. 1, 2015

(30) Foreign Application Priority Data
Jan. 11, 2012 (JP) .................................. 2012-003606

(51) Int. Cl.
*C21D 9/00* (2006.01)
*C21D 1/18* (2006.01)
(Continued)

(52) U.S. Cl.
CPC ............ *C21D 9/0093* (2013.01); *C22C 38/00* (2013.01); *C22C 38/001* (2013.01);
(Continued)

(58) Field of Classification Search
None
See application file for complete search history.

(56) References Cited

U.S. PATENT DOCUMENTS

| 5,776,267 A | 7/1998 | Nanba et al. |
| 2006/0169366 A1 | 8/2006 | Yuse et al. |

(Continued)

FOREIGN PATENT DOCUMENTS

| CN | 1827819 A | 9/2006 |
| JP | 6 240409 | 8/1984 |

(Continued)

OTHER PUBLICATIONS

Machine-English translation of specification, JP 2002-097543, Kochi Takuya et al., Apr. 2, 2002.*

(Continued)

*Primary Examiner* — Deborah Yee
(74) *Attorney, Agent, or Firm* — Oblon, McClelland, Maier & Neustadt, L.L.P.

(57) ABSTRACT

A steel is used for providing a bolt that has a high strength and still exhibits excellent hydrogen embrittlement resistance. The steel contains C of 0.30% to 0.50%, Si of 1.0% to 2.5%, Mn of 0.1% to 1.5%, P of greater than 0% to 0.015%, S of greater than 0% to 0.015%, Cr of 0.15% to 2.4%, Al of 0.010% to 0.10%, N of 0.001% to 0.10%, Cu of 0.1% to 0.50%, Ni of 0.1% to 1.0%, Ti of 0.05% to 0.2%, and V of 0% to 0.2%, with the remainder including iron and inevitable impurities, in which a ratio [Ni]/[Cu] is 0.5 or more, and a total content [Ti]+[V] is 0.085% to 0.30%.

18 Claims, 2 Drawing Sheets

(51) Int. Cl.

| | |
|---|---|
| *C22C 38/42* | (2006.01) |
| *C22C 38/50* | (2006.01) |
| *C21D 8/02* | (2006.01) |
| *F16B 35/00* | (2006.01) |
| *F16B 33/00* | (2006.01) |
| *C22C 38/00* | (2006.01) |
| *C22C 38/04* | (2006.01) |
| *C22C 38/06* | (2006.01) |
| *C22C 38/34* | (2006.01) |
| *C22C 38/46* | (2006.01) |
| *C22C 38/02* | (2006.01) |
| *C22C 38/44* | (2006.01) |
| *C22C 38/58* | (2006.01) |
| *C23C 8/14* | (2006.01) |
| *F16B 33/06* | (2006.01) |
| *C21D 8/00* | (2006.01) |

(52) U.S. Cl.
CPC ........... *C22C 38/002* (2013.01); *C22C 38/02* (2013.01); *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/50* (2013.01); *C22C 38/58* (2013.01); *C23C 8/14* (2013.01); *F16B 33/06* (2013.01); *F16B 35/00* (2013.01); *C21D 1/18* (2013.01); *C21D 8/005* (2013.01); *F16B 33/00* (2013.01)

(56) References Cited

U.S. PATENT DOCUMENTS

2006/0196584 A1   9/2006   Kochi et al.

2008/0308195 A1   12/2008   Yoshihara et al.
2009/0238713 A1*  9/2009   Kinugasa ............... C21D 1/20
                                                           420/83

FOREIGN PATENT DOCUMENTS

| | | |
|---|---|---|
| JP | 60 114551 | 6/1985 |
| JP | 2 267243 | 11/1990 |
| JP | 3 243745 | 10/1991 |
| JP | 2006 233326 | 9/1996 |
| JP | 9 263875 | 10/1997 |
| JP | 10-121201 A | 5/1998 |
| JP | 2002-097543 A | 4/2001 |
| JP | 2002 97543 | 4/2002 |
| JP | 2005-29870 A | 2/2005 |
| JP | 2006-291295 A | 10/2006 |
| JP | 4031068 | 1/2008 |
| JP | 2012 17484 | 1/2012 |
| WO | WO 2008/044859 A1 | 4/2008 |
| WO | 2012 098938 | 7/2012 |

OTHER PUBLICATIONS

Machine-English translation of specification, JP 06-240409, Izumi Koji et al., Aug. 30, 1994.*
International Search Report Issued Feb. 5, 2013 in PCT/JP12/080440 Filed Nov. 26, 2012.
Written Opinion of the International Searching Authority Issued Feb. 5, 2013 in PCT/JP12/080440 Filed Nov. 26, 2012.
Extended European Search Report issued May 18, 2016 in Patent Application No. 12864751.8.

* cited by examiner (a) TEST No.1

(b) TEST No.20

STEEL FOR BOLT USE, BOLT, AND METHOD FOR MANUFACTURING BOLT

TECHNICAL FIELD

The present invention relates to bolts for use typically in automobiles and various kinds of industrial machinery, steels to form the bolts; and methods for manufacturing the bolts. Specifically, the present invention relates to a high-strength bolt that has a high strength and still exhibits excellent hydrogen embrittlement resistance; a steel for bolt use which is used for manufacturing the bolt; and a method for manufacturing the bolt.

BACKGROUND ART

Delayed fracture occurs in iron and steel materials after a lapse of a certain time from the application of stress on the materials. Different causes may probably be tangled complicatedly to cause delayed fracture. This impedes the identification of the causes. In general, however, a common view is that a hydrogen embrittlement phenomenon is involved in delayed fracture. Independently, the tempering temperature, microstructure, material hardness, grain size, and alloy elements are recognized for the present as factors that influence the hydrogen embrittlement phenomenon. However, there is not established a process of preventing hydrogen embrittlement, and various processes or techniques have been proposed merely by trial-and-error methods under the present circumstances.

Exemplary techniques to improve the hydrogen embrittlement resistance of a bolt can be found in Patent Literature (PTL) 1 to 3 as a technique of adapting alloy elements. PTL 1 to 3 disclose that the adaptation of alloy elements gives a high-strength bolt having a high strength and still exhibiting excellent delayed fracture resistance. PTL 4 mentions that an alloy steel can have better hydrogen embrittlement resistance by quenching the alloy steel, tempering the alloy steel after quenching to allow fine alloy compounds to precipitate in large numbers, and allowing the precipitates to trap hydrogen (diffusible hydrogen) migrating in the steel.

A steel manufactured by the technique of adding large amounts of alloy elements as in PTL 1 to 4 exhibits excellent hydrogen embrittlement resistance (delayed fracture resistance) in an environment at a relatively low hydrogen level. The steel, however, becomes susceptible to delayed fracture contrarily in an environment at such a high hydrogen level as to consume all the hydrogen trapping sites and in an environment involving severe steel corrosion. This is because hydrogen once trapped by carbide particles acting as trapping sites is released from the trapping sites when the environment temperature changes and/or the steel stress varies. In the environments, therefore, hydrogen is released from the trapping sites under the circumstances to increase the diffusible hydrogen content in the steel.

CITATION LIST

Patent Literature

PTL 1: Japanese Unexamined Patent Application Publication (JP-A) No. S60(1985)-114551
PTL 2: JP-A No. H02(1990)-267243
PTL 3: JP-A No. H03(1991)-243745
PTL 4: Japanese Patent No. 4031068

SUMMARY OF INVENTION

Technical Problem

The present invention has been made under such circumstances, and an object thereof is to provide a bolt, a steel for bolt use which is useful for the manufacturing of the bolt, and a method for manufacturing the bolt, where the bolt has a high strength and still exhibits excellent hydrogen embrittlement resistance. Another object of the present invention is to provide a bolt, a steel for bolt use, and a manufacturing method of the bolt, where the bolt exhibits excellent hydrogen embrittlement resistance even in an environment at a high hydrogen level or in an environment involving severe steel corrosion.

Solution to Problem

The present invention can achieve the objects and provides a steel for bolt use, including.
C in a content (in mass percent, hereinafter the same) of 0.30% to 0.50%;
Si in a content of 1.0% to 2.5%;
Mn in a content of 0.1% to 1.5%;
P in a content of greater than 0% to 0.015%;
S in a content of greater than 0% to 0.015%;
Cr in a content of 0.15% to 2.4%;
Al in a content of 0.010% to 0.10%;
N in a content of 0.001% to 0.10%;
Cu in a content of 0.1% to 0.50%, and Ni in a content of 0.1% to 1.0%, so that [Ni]/[Cu]≥0.5 is met, where [Ni] and [Cu] denote contents (in mass percent) of Ni and Cu, respectively, in the steel; and
Ti in a content of 0.05% to 0.2%, and V in a content of 0% to 0.2%, so that [Ti]+[V] is 0.085% to 0.30%, where [Ti] and [V] denote contents (in mass percent) of Ti and V, respectively, in the steel;
with the remainder being iron and inevitable impurities.
The steel for bolt use may further include Mo in a content of greater than 0% to 0.1%.

The present invention further provides a bolt having the chemical composition, in which:
the bolt having an austenitic grain size number of 9.0 or more in a shank thereof;
the bolt has a G-value (%) meeting a condition as specified by Expression (1), where the G-value indicates a percentage of carbide particles formed at austenite grain boundaries in the shank, Expression (1) given as follows:

$$G\text{-value}=(L/L0)\times 100 \leq 60 \quad (1)$$

where:
L denotes a total length of carbide particles formed at the austenite grain boundaries and having a thickness of 50 nm or more; and
L0 denotes a length of the austenite grain boundaries.

In a preferred embodiment, the bolt has an iron oxide layer containing Si and Cu in a surface of the shank; and the oxide layer has a thickness of 2.0 to 100 nm. In another preferred embodiment, the bolt has a tensile strength of 1400 MPa or more.

In addition and advantageously, the present invention includes a method for manufacturing a bolt, the method including the steps of:
preparing a steel having the chemical composition;
heating the steel to a temperature of 1050° C. or higher;
hot-rolling the steel after the heating, where finish rolling is performed at a temperature of 1000° C. or lower; and tempering a bolt in a quenching-tempering process after bolt forming at a temperature of 400° C. to T° C., where the temperature T is specified by Expression (2) given as follows:

$$T(°C.) = 68.2 \, Ln \, [Si] + 480 \quad (2)$$

where Ln denotes a natural logarithm; and [Si] denotes a content (in mass percent) of Si in the steel.

In a preferred embodiment to yield the bolt having an iron oxide layer, an iron oxide layer on a shank surface of the bolt to be subjected to the tempering is restricted to 0 to 100 nm; and the tempering is performed in an inert gas atmosphere having an oxygen content of 10 ppm (by volume) or less.

Advantageous Effects of Invention

The present invention in an embodiment adapts a steel to have a appropriate chemical composition and manufactures a bolt from the steel under appropriate conditions. This allows the austenite grain boundaries, which would act as delayed fracture origins, to have a higher strength and reduces hydrogen trapping sites such as carbides. The present invention in the embodiment can therefore provide a high-strength bolt that exhibits excellent hydrogen embrittlement resistance not only in an environment at a relatively low hydrogen level, but also in an environment at such a high hydrogen level as to consume all the hydrogen trapping sites.

In addition, the present invention forms, in an embodiment, a dense iron oxide layer on a surface of a bolt manufactured under such appropriately adjusted conditions, where the iron oxide layer resists hydrogen migration (hydrogen entry). The resulting bolt can exhibit excellent hydrogen embrittlement resistance even in a severe corrosive environment.

The steel for bolt use according to the embodiment of the present invention excels in hot ductility and cold workability (cold forgeability typified by bolt headability), from which the bold can be manufactured in good productivity.

DESCRIPTION OF EMBODIMENTS

Figure 1:
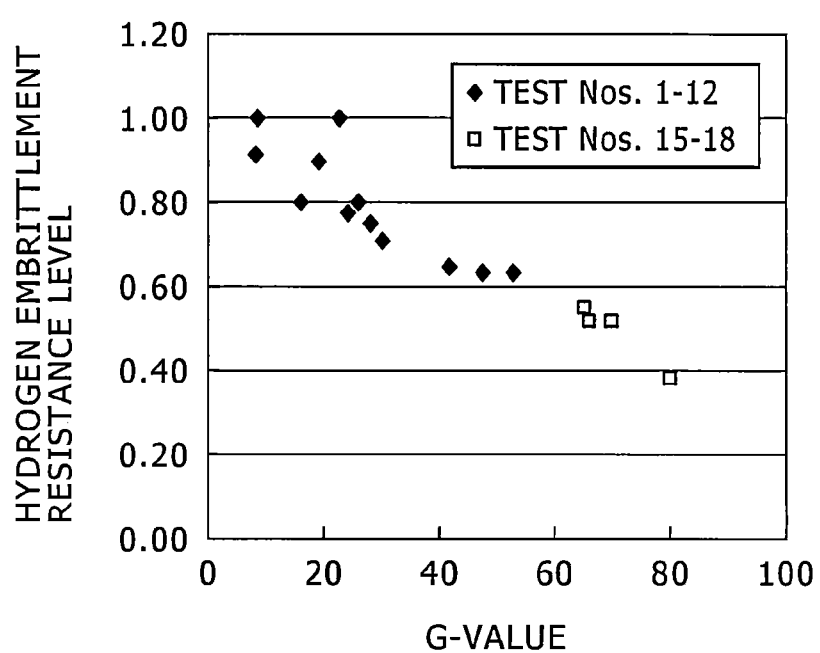
FIG. 1 is a graphic chart illustrating how the hydrogen embrittlement resistance level (evaluation result of hydrogen embrittlement resistance) varies depending on the G-value.

The present inventors made investigations on the hydrogen embrittlement phenomenon that is one of causes of the delayed fracture phenomenon of high-strength bolts. They examined again how the contents of alloy elements and steel microstructures affect the hydrogen embrittlement phenomenon, particularly, how carbonitrides acting as hydrogen trapping sites affect the phenomenon, where the carbonitride hydrogen trapping sites have been believed to be effective for rendering hydrogen harmless. As a result, they found as follows. The carbonitride hydrogen trapping sites surely advantageously fix and render diffusible hydrogen harmless, where the diffusible hydrogen is believed to be a main cause of hydrogen embrittlement. However, hydrogen fixed to the hydrogen trapping sites are easily released from the trapping sites due to steel temperature change and/or stress variation to be loaded and acts as diffusible hydrogen to cause hydrogen embrittlement, as mentioned above. In addition, the present inventors verified that the hydrogen released from a hydrogen trapping site may be fixed and rendered harmless again by another hydrogen trapping site, where the other hydrogen trapping site is present in the vicinity of the initial hydrogen trapping site; but the released hydrogen fails to be fixed again and readily causes hydrogen embrittlement in an environment at such a high hydrogen level as to cause the hydrogen trapping sites in the steel to be saturated.

Based on the findings, the present inventors made intensive investigations on techniques for allowing a steel to have better hydrogen embrittlement resistance even in an environment at such a high hydrogen level as to cause hydrogen trapping sites in the steel to be saturated. As a result, they have found that increase of strength of austenite grain boundaries (hereinafter also simply referred to as "grain boundaries") is most effective in the environment, where the austenite grain boundaries will act as origins of hydrogen embrittlement. To increase the strength of austenite grain boundaries, customary technologies have employed a technique of performing tempering at a high temperature to cleave carbide particles formed at the grain boundaries. The present inventors, however, have found that it is effective to minimize the precipitation of carbide particles at the austenite grain boundaries; and that it is most effective for the minimization to perform tempering in a relatively low temperature range in quenching-tempering after bolt shaping (bolt forming).

In general, the tempering, if performed at a temperature of lower than 400° C., might cause the resulting bolt to have a low ratio (yield ratio) of the yield stress to the tensile strength, to be hardly fastened with a high axial tension, and to have inferior relaxation properties. To prevent this, the present inventors assumed that the tempering temperature be 400° C. or higher and made investigations on such a steel chemical composition as to resist precipitation of carbides, such as cementite, at the austenite grain boundaries even when the tempering is performed at a temperature of 400° C. or higher.

The present inventors have resultantly found that the addition of Si in a content of 1.0% or more allows the carbides to precipitate at a higher temperature. This is probably because Si present to surround solute carbon in the steel after quenching inhibits carbon from diffusing or migrating during tempering and thereby impedes the precipitation of carbides. The embodiment of the present invention as above allows the steel to contain Si in a predetermined content or more and thereby allows the carbides to precipitate at a higher temperature. The tempering herein is performed at a temperature of 400° C. or higher to achieve a high yield ratio and at a temperature equal to or lower than a temperature T (tempering temperature) to suppress carbide precipitation at the austenite grain boundaries and to improve hydrogen embrittlement resistance, where the temperature T is specified by Expression (2) and determined by the Si content in the steel.

In particular, the suppression of carbide precipitation stabilizes transition carbides such as ε-carbide and η-carbide, where the transition carbides also advantageously retard hydrogen diffusion (hydrogen migration) in the steel. The bolt according to an embodiment of the present invention characteristically has a low apparent hydrogen diffusion coefficient of $9.5 \times 10^{-7}$ cm$^2$/s or less as determined by a hydrogen permeation test. The low hydrogen diffusion coefficient and the slow hydrogen accumulation at the austenite grain boundaries may probably also contribute to better hydrogen embrittlement resistance.

The carbide precipitation at the austenite grain boundaries is minimized in the embodiment of the present invention as described above. Specifically, a G-value given as: (L/L0)× 100 is adapted to meet a condition as specified by Expression (1), where the G-value indicates the percentage of carbide particles formed at the austenite grain boundaries in the bolt shank, where Expression (1) is given as follows:

$$(L/L0) \times 100 \leq 60 \qquad (1)$$

where:

L denotes a total length of carbide particles formed at the austenite grain boundaries and having a thickness of 50 nm or more; and L0 denotes a length of the austenite grain boundaries.

Specifically, the bolt according to the embodiment of the present invention includes neither spherical carbides nor film-like carbides at the austenite grain boundaries, or includes, if any, the spherical and film-like carbide particles in an amount of 60% or less with respect to the length of the grain boundaries. The carbide particles, even if present at the grain boundaries, can be treated as insignificant when they have a thickness of 50 nm or less, because such thin carbide particles less adversely affect the hydrogen embrittlement resistance. The term "thickness" herein refers to a dimension (length) of a carbide particle vertical to the grain boundaries. The G-value is preferably 45% or less and more preferably 35% or less. The smaller in amount the carbide particles formed at the austenite grain boundaries is, the better. The G-value is therefore not critical in its lower limit, but is generally about 5% or more.

The bolt according to the embodiment of the present invention has an austenitic grain size number of 9.0 or more in the bolt shank. Such refined austenite grains help the bolt to have better toughness and to thereby exhibit better hydrogen embrittlement resistance and a higher yield ratio. The austenitic grain size number is preferably 9.5 or more and more preferably 10.0 or more. The larger the austenitic grain size number is, the better. Thus, the austenitic grain size number is not critical in its upper limit, but is generally 15 or less.

The present inventors have further found that the type and thickness of an oxide layer in the bolt surface layer may preferably be controlled so as to provide better hydrogen embrittlement resistance in a severe corrosive environment, where the oxide layer is formed in the quenching-tempering process in bolt manufacturing. This is because the type and thickness of the oxide layer significantly affect the hydrogen migration (entry) properties into the steel. Specifically, the present inventors have found that an iron oxide layer containing Si and Cu and having a thickness of 2.0 to 100 nm, when present as the oxide layer in the bolt surface layer, acts as a dense layer exhibiting excellent corrosion resistance and very effectively suppresses the hydrogen migration into the steel.

The iron oxide layer to be employed in the embodiment of the present invention thereinafter also simply referred to as "iron oxide layer") will be illustrated below. The iron oxide layer contains Si and Cu and mainly includes, for example, $(Fe,Si)_3O_4$ and $(Fe,Cr)_3O_4$. Cu may probably be present alone in the iron oxide layer. The iron oxide layer contains Si and Cu in such contents that spectra assigned to Si and Cu can be clearly distinguished from noise components in an analysis with an energy dispersive X-ray spectrometer (EDX) at an acceleration voltage of 20 kV.

The iron oxide layer is dense and exhibits hydrogen migration suspension activity. To exhibit the activity sufficiently, the oxide layer has a thickness of preferably 2.0 nm or more, more preferably 5 nm or more, and furthermore preferably 10 nm or more. The dense iron oxide layer herein is very thin and may have a thickness of 100 nm or less in terms of its upper limit.

The chemical composition of the steel for bolt use (bolt) according to the embodiment of the present invention will be illustrated below.

C in a Content of 0.30% to 0.50%

Carbon (C) element is necessary to allow the steel to have a tensile strength at certain level. The C content herein may be specified to be 0.30% or more so as to ensure a high strength (particularly, a tensile strength of 1400 MPa or more). The C content is preferably 0.35% or more and more preferably 0.39% or more. In contrast, carbon, if present in an excessively high content, may cause the steel (bolt) to have inferior toughness, to be susceptible to carbide precipitation at the austenite grain boundaries, and to suffer from inferior hydrogen embrittlement resistance due to reduction in grain boundary strength. Such excess carbon may also cause the steel to be inferior in cold workability (cold forgeability, particularly bolt headability). In addition, excess carbon may cause the steel to have inferior corrosion resistance in a corrosive environment. To prevent these, the C content may be specified to be 0.50% or less, and is preferably 0.48% or less, and more preferably 0.45% or less.

Si in a Content of 1.0% to 2.5%

Silicon (Si) element acts as a deoxidizer in ingot-making and is necessary as a solute element to strengthen the steel. The element is herein also important for reasons as follows. Specifically, the element suppresses carbide precipitation at the austenite grain boundaries and contributes to a higher strength of the grain boundaries. In addition, the element stabilizes the transition carbides and helps the steel to have a lower hydrogen diffusion coefficient, as described above. To exhibit the activities, the Si content may be specified to be 1.0% or more, and is preferably 1.2% or more, and more preferably 1.5% or more. In contrast, Si, if present in an excessively high content, may cause the steel to have inferior cold workability and may encourage grain boundary oxidation during quenching to cause the steel to have inferior hydrogen embrittlement resistance. To prevent this, the Si content may be specified to be 2.5% or less, and is preferably 2.3% or less, and more preferably 2.0% or less.

Mn in a Content of 0.1% to 1.5%

Manganese (Mn) element helps the steel to have better hardenability and importantly contributes to a high strength of the steel. Mn readily forms compounds with sulfur and, when added in a predetermined content or more, has an activity of suppressing the formation of FeS that will precipitate at the grain boundaries to lower the grain boundary strength. To exhibit the activities effectively, the Mn content may be specified to be 0.1% or more. The Mn content is preferably 0.13% or more, and more preferably 0.15% or more. In contrast, Mn, if contained in a excessively high content, may encourage the segregation of MnS at the grain boundaries and may thereby lower the grain boundary strength to cause the steel to have inferior hydrogen embrittlement resistance. To prevent this, the Mn content may be specified to be 1.5% or less, and is preferably 1.0% or less, and more preferably 0.5% or less.

P in a Content of Greater than 0% to 0.015%

Phosphorus (P) element segregates at the grain boundaries, thereby lowers the grain boundary strength, and causes the steel to have inferior hydrogen embrittlement resistance. To prevent this, the P content may be specified to be 0.015% or less, and is preferably 0.010% or less, and more preferably 0.008% or less. Phosphorus is preferably minimized in amount, but phosphorus remaining in a content of about 0.001% is allowable. This is because complete elimination of phosphorus to 0% invites increase in steel production cost and is difficult.

S in a Content of Greater than 0% to 0.015%

Sulfur (S) element forms a sulfide (MnS). Sulfur, if contained in an excessively high content, may form coarse MnS particles, and the coarse MnS particles may act as stress concentration regions to cause the steel to have inferior hydrogen embrittlement resistance. To prevent this, the S content may be specified to be 0.015% or less, and is preferably 0.010% or less, and more preferably 0.005% or less. As with phosphorus, sulfur is preferably minimized in amount, but sulfur remaining in a content of about 0.001% is allowable, because complete elimination of sulfur to 0% invites increase in steel production cost and is difficult.

Cr in a Content of 0.15% to 2.4%

Chromium (Cr) element acts as a nucleus for spherical carbide particle formation in spheroidizing, thereby promotes softening, and importantly contributes to better cold forgeability (particularly, bolt headability). The element also helps the steel to have better corrosion resistance in a corrosive environment. To exhibit the activities effectively, the Cr content may be specified to be 0.15% or more, and is preferably 0.5% or more, and more preferably 0.8% or more. In contrast, Cr, if present in an excessively high content, may cause the formation of coarse carbonitride particles and may cause the steel to have inferior toughness and, as a result, inferior hydrogen embrittlement resistance. To prevent this, the Cr content may be specified to be 2.4% or less, and is preferably 1.5% or less, more preferably 1.3% or less, and furthermore preferably 1.2% or less.

Al in a Content of 0.010% to 0.10%

Aluminum (Al) element acts as a deoxidizer in ingot-making, is combined with nitrogen in the steel to form AlN, thereby suppresses grain growth, and resultantly helps the steel to have better hydrogen embrittlement resistance due to grain refinement. To exhibits the activities, the Al content may be specified to be 0.010% or more and is more preferably 0.015% or more. In contrast, Al, if present in an excessively high content, may form oxide inclusions such as $Al_2O_3$ acting as stress concentration points and may cause the steel to have inferior hydrogen embrittlement resistance. In this case, coarse AlN particles may be formed to impede grain refinement, and this may cause the steel to have insufficient toughness and inferior hydrogen embrittlement resistance. To prevent this, the Al content may be specified to be 0.10% or less, and is preferably 0.07% or less, and more preferably 0.05% or less.

N in a Content of 0.001% to 0.10%

Nitrogen (N) element forms nitrides, thereby contributes to grain refinement, and helps the steel to have better hydrogen embrittlement resistance. To exhibit the activities effectively, the N content may be specified to be 0.001% or more, more preferably 0.002% or more, and furthermore preferably 0.004% or more. In contrast, nitrogen, if present in an excessively high content, may be dissolved as a solute in the steel in a larger amount and may cause the steel to have inferior cold workability and hydrogen embrittlement resistance. To prevent this, the N content may be specified to be 0.015% or less, and is preferably 0.007% or less, and more preferably 0.006% or less.

Cu in a Content of 0.1% to 0.50% and Ni in a Content of 0.1% to 1.0%; where [Ni]/[Cu]≥0.5

Copper (Cu) element effectively helps the steel to ensure a strength in tempering at a low temperature where transition carbide precipitation occurs. The element also helps the steel to have better corrosion resistance in a corrosive environment. To exhibit the activities effectively, the Cu content may be specified to be 0.1% or more, and is preferably 0.15% or more, and more preferably 0.20% or more. In contrast, Cu, if present in an excessively high content, may exhibit saturated activities and may cause the steel to have inferior hot ductility and to be produced in low productivity. Such excess Cu may also cause the steel to be inferior in cold workability, toughness, and hydrogen embrittlement resistance. In addition, the excess Cu may cause the steel to exhibit higher hardness upon bolt working and may invite a shorter life of a tool. To prevent these, the Cu content may be specified to be 0.50% or less, and is preferably 0.4% or less, and more preferably 0.3% or less.

Nickel (Ni) element effectively helps the steel to surely have a certain strength during tempering at a low temperature at which transition carbides precipitate, as with Cu. The element helps the steel to have better toughness and actively compensates for decreases in hot ductility due to increase in Cu content. In addition, the element can help the steel to have better corrosion resistance in a corrosive environment. To exhibit the activities effectively, the Ni content may be specified to be 0.1% or more, and is preferably 0.30% or more, and more preferably 0.35% or more. In contrast, Ni, if present in an excessively high content, may exhibit saturated activities and may invite a higher production cost. To prevent this, the Ni content may be specified to be 1.0% or less, and is preferably 0.6% or less, and more preferably 0.45% or less.

The Cu and Ni contents fall within the above-specified ranges, in which a ratio [Ni]/[Cu] is 0.5 or more ([Ni]/[Cu] ≥0.5), where [Ni] and [Cu] are contents (in mass percent) of Ni and Cu, respectively, in the steel. Ni, when present in a content at a predetermined level or more with respect to the Cu content, can compensate for decreases in hot ductility due to increase in Cu content. The ratio [Ni]/[Cu] is preferably 1.0 or more, and more preferably 1.5 or more.

Ti in a Content of 0.05% to 0.2% and V in a Content of 0% to 0.2%; where [Ti]+[V] is 0.085% to 0.30%

Titanium (Ti) and vanadium (V) elements both form fine carbide particles, thereby contribute to grain refinement, and help the steel to have better toughness. To exhibit the activities effectively, the Ti content may be specified to be 0.05% or more, and is preferably 0.060% or more, and more preferably 0.065% or more. The V content is preferably 0.1% or more, and more preferably 0.14% or more. In contrast, Ti and V, when present in excess, may both form coarse carbonitride particles and may cause the steel to be inferior in cold forgeability (particularly, bolt headability). Ti and V, when present in excess, may increase hydrogen trapping sites and thereby increase the hydrogen content in the steel. This may cause the steel to be susceptible to hydrogen embrittlement when hydrogen is released from the trapping sites due typically to temperature change or stress variation. To prevent this, the Ti and V contents may be specified herein each to be 0.2% or less in terms of upper limit. The Ti content is preferably 0.15% or less, and more preferably 0.1% or less. The V content is preferably 0.18% or less, and more preferably 0.17% or less. The total content ([Ti]+[V]) of Ti and V is specified herein to be 0.085% or more so as to exhibit the grain refinement activity of Ti and V effectively. The total content is preferably 0.1% or more, and more preferably 0.2% or more. In contrast, the total content ([Ti]+[V]) of Ti and V may be specified to be 0.30% or less so as to reduce the activity of Ti and V as hydrogen trapping sites. The total content is preferably 0.26% or less, and more preferably 0.24% or less. Of Ti and V, Ti is essentially contained in the steel according to the embodiment of the present invention, because Ti has a grain refinement activity greater than that of V.

The steel for bolt use (bolt) according to the embodiment of the present invention has the basic chemical composition as mentioned above, with the remainder substantially including iron. It is naturally accepted, however, that the steel contains inevitable impurities derived from raw materials, facility materials, and production facilities. The steel for bolt use according to the embodiment of the present invention may further include Mo as follows, according to necessity.

Mo in a Content of Greater than 0% to 0.1%

Molybdenum (Mo) element contributes to better hardenability and effectively helps the steel to have a high strength. The element also effectively suppresses grain boundary oxidation and is effective in such a steel having a high Si content as in the embodiment of the present invention. To exhibit the activities effectively, the Mo content is preferably 0.01% or more, and more preferably 0.03% or more. In contrast, Mo, if present in an excessively high content, may cause increase in steel cost and bolt production cost. To prevent this, the Mo content is preferably 0.1% or less, more preferably 0.08% or less, and furthermore preferably 0.07% or less.

The bolt according to the embodiment of the present invention may be manufactured typically by making a steel having the chemical composition by a common ingot-making technique; subjecting the steel (work) to casting, hot rolling, and wire drawing; subjecting the work to a softening treatment such as spheroidizing, descaling and finish-wire-drawing the work; shaping the work into a bolt typically by cold heading or cold forging and quenching and tempering the bolt. The steel having the chemical composition can give a bolt that has a high strength and excellent hydrogen embrittlement resistance. To give a bolt having further excellent hydrogen embrittlement resistance even having a high strength, it is important that the bolt is manufactured by appropriately controlling conditions for the hot rolling and quenching-tempering treatment, among the series of steps. In a preferred embodiment, the quenching conditions are also controlled. The steel for bolt use and method for manufacturing a bolt will be illustrated below.

To reduce the amount of carbide particles formed at the austenite grain boundaries, the carbide particles should be sufficiently dissolved upon quenching. To this end, carbide particles in the initial microstructure should be precipitated uniformly. Such an initial microstructure is generally a spheroidized microstructure. To allow the carbide particles to disperse uniformly in the spheroidized microstructure, it is important that carbides typically of Cr, Ti, and V acting as nuclei of spheroidized carbide particles are finely precipitated by appropriately controlling the heating temperature prior to the hot rolling (reheating temperature in the form of billets) and the hot rolling conditions; and that the number of triplet points in the austenite grain boundaries is increased, i.e., austenite grains are refined, where the triple points are each a point at which three austenite grains are in contact with one another.

Initially, the heating temperature before hot rolling (re-heating temperature in billets) may be specified to be 1050° C. or higher to dissolve elements such as Cr, Ti, and V in the austenitic region. The heating, if performed at an excessively low temperature, may fail to contribute to sufficient dissolution of the elements such as Cr, Ti, and V in austenite, and this may impede precipitation of fine carbide particles during hot rolling and may cause spheroidization in the downstream step to be insufficient and cause the bolt to have inferior cold workability. The heating is performed at a temperature of preferably 1100° C. or higher, and more preferably 1150° C. or higher. The upper limit of the temperature may be about 1300° C. from the viewpoint of production cost.

Next, the hot rolling may be performed at a low finish rolling temperature for austenite grain refinement. The finish rolling at such a low temperature allows strain to remain in the steel and thereby allows spheroidized carbide particles to be dispersed more uniformly. The upper limit of the finish rolling temperature may be specified to be 1000° C. from the viewpoints. Finish rolling, if performed at a temperature higher than 1000° C., may cause austenite grains to coarsen, fail to allow the strain to remain, and cause spheroidized carbide particles to be dispersed nonuniformly. The finish rolling temperature is preferably 950° C. or lower, and more preferably 900° C. or lower. However, finish rolling, if performed at an excessively low temperature, may cause increase in rolling load and in surface flaws, thus being unpractical. The lower limit of the finish rolling temperature is preferably 700° C. As used herein the term "finish rolling temperature" refers to an average temperature of the work surface before a final rolling pass or before reduction rolls, where the temperature can be measured with a radiation thermometer.

Next, the conditions for the quenching-tempering treatment (thermal refining treatment) will be illustrated in the order from step to step. Initially, heating in quenching is preferably performed at a temperature of 860° C. to 930° C. Heating in quenching, when performed at an excessively low temperature, may cause insufficient dissolution of carbide particles formed in the hot rolling and/or softening treatment, and this may cause the bolt to have a low strength. In addition, the heating may cause coarse carbide particles to remain at the austenite grain boundaries. In this case, the coarse carbide particles act as hydrogen embrittlement origins and cause the bolt to have inferior hydrogen embrittlement resistance. The heating temperature is more preferably 880° C. or higher, and furthermore preferably 890° C. or higher. In contrast, heating in quenching, if performed at an excessively high temperature, may cause grains to coarsen and cause the bolt to have inferior hydrogen embrittlement resistance. The heating temperature is more preferably 920° C. or lower, and furthermore preferably, 910° C. or lower.

Though not limited, the quenching treatment is preferably performed in a normal atmosphere (air) from the viewpoint of production cost.

In a preferred embodiment, a dense iron oxide layer is formed in a surface layer of the bolt shank in the after-mentioned tempering process so as to allow the bolt to have better corrosion resistance. For the embodiment, it is important that an iron oxide layer is not present in the bolt shank before tempering, or, even if present, has a thickness of 100 nm or less. This is because a non-dense iron oxide layer having a thickness of greater than 100 nm, if present before tempering, may impede the formation of the dense oxide layer in the tempering. The formation of the iron oxide layer during quenching may be suppressed typically by performing the quenching in such an atmosphere as not to form a non-dense iron oxide layer, i.e., in an inert gas atmosphere having a lowered oxygen content.

A non-dense oxide layer may be formed when the quenching is performed in the atmosphere (in the air). In this case, the formed non-dense oxide layer is preferably removed. The non-dense oxide layer may be removed by any procedure not limited, such as acid washing or mechanical removing. The heating may be performed by any procedure such as heating in a common electric furnace or gas furnace, or radio-frequency heating.

The tempering is performed at a temperature of 400° C. to T° C. or lower, where the temperature T is specified by Expression (2) as follows:

$$T(° C.) = 68.2 \, \text{Ln} \, [Si] + 480 \quad (2)$$

where Ln denotes a natural logarithm; and [Si] denotes a content (in mass percent) of Si in the steel.

The precipitation temperature of carbide particles in tempering varies depending on the Si content in the steel and is expressed by (68.2 Ln [Si]+480)° C. Tempering, if performed at a temperature higher than T° C., may cause carbide particles to precipitate at the grain boundaries, cause the grain boundary strength to be lowered, and thereby cause the bolt to have inferior hydrogen embrittlement resistance. To prevent this, the tempering is performed at a temperature of (68.2 Ln [Si]+480)° C. or lower. The tempering temperature is preferably (T−20)° C. or lower, i.e., (68.2 Ln [Si]+460)° C. or lower, and more preferably (T−40)° C. or lower, i.e., (68.2 Ln [Si]+440)° C. or lower. In contrast, tempering, if performed at an excessively low temperature, may cause the bolt to have a low yield ratio, and the resulting bolt may fail to be fastened at a high axial tension, as described above. To prevent this, the tempering treatment is performed at a temperature of 400° C. or higher, preferably 420° C. or higher, and more preferably 425° C. or higher.

Also though not limited, the tempering treatment is preferably performed in a normal atmosphere (normal air) from the viewpoint of production cost. However, when a dense iron oxide layer is to be formed for better corrosion resistance, the tempering is preferably performed in an inert gas atmosphere having an oxygen content of 10 ppm (by volume) or less. Tempering, if performed in an atmosphere having an oxygen content of greater than 10 ppm, may cause the formation of a non-dense oxide layer. The inert gas usable herein is exemplified by nitrogen ($N_2$) and argon gas. The heating may be performed by any procedure not limited, such as heating in a common electric furnace or gas furnace, or radio-frequency heating.

Other conditions for the quenching-tempering can be appropriately set in consideration of the temperature range and may be selected within ranges as follows.

Quenching Conditions
  Holding time after heating 5 minutes or longer (more preferably 15 minutes or longer), 60 minutes or shorter (more preferably 30 minutes or shorter)
  Cooling condition: oil cooling or water cooling
Tempering Conditions
  Holding time after heating: 10 minutes or longer (more preferably 20 minutes or longer), 90 minutes or shorter (more preferably 45 minutes or shorter)
  Cooling condition: oil cooling or water cooling The bolt according to an embodiment of the present invention has a high strength in terms of tensile strength of 1400 MPa or more and exhibits excellent hydrogen embrittlement resistance even though having such a high strength.

EXAMPLES

The present invention will be illustrated in further detail with reference to several examples below. It should be noted, however, that the examples are never intended to limit the scope of the invention; that various changes and modifications may be made therein without deviating from the spirit and scope of the invention as described above and below and all of them should be considered to be within the scope of the invention.

Experimental Example 1

Hydrogen embrittlement resistance in a cathodic charge environment was examined in Experimental Example 1, the results of which will be described below.

Steels having chemical compositions given in Table 1 (with the remainder being iron and inevitable impurities) were made by a common ingot-making technique. The steels were cast, hot-rolled under conditions given in Tables 2 and 3, and yielded rolled steels each having a diameter of 14 mm. The rolled steels were subjected sequentially to descaling, a coating treatment, wire drawing, and spheroidizing, and further subjected sequentially to descaling, a coating treatment, and finish wire drawing. The resulting steel wires were subjected to cold heading with the Part Former (NBP550 supplied by Sakamura Machine Co., Ltd) and yielded flange bolts having dimensions of M12×1.25P and a length of 200 mm. The bolt headability (cold headability) of each flange bolt was evaluated by whether or not cracking occurred in the flange. In Tables 2 and 3, a sample suffering from cracking in the flange was evaluated as having poor bolt headability and indicated by "x"; whereas a sample not suffering from cracking in the flange was evaluated as having good bolt headability and indicated by "○". The flange bolts were subjected to quenching-tempering under conditions given in Table 2 or 3. Other quenching-tempering conditions are as follows: quenching heating time of 30 minutes; quenching in-furnace atmosphere of air; quenching cooling condition of oil cooling (70° C.); tempering heating time of 45 minutes; tempering in-furnace atmosphere of air; and tempering cooling condition of oil cooling (25° C.).

TABLE 1

| Steel number | Chemical composition (in mass percent) with the remainder being iron and inevitable impurities | | | | | | | | | | | | | | |
|---|---|---|---|---|---|---|---|---|---|---|---|---|---|---|---|
| | C | Si | Mn | P | S | Cu | Ni | Cr | Mo | V | Ti | Al | N | Ni/Cu | Ti + V |
| A1 | 0.41 | 1.76 | 0.17 | 0.004 | 0.002 | 0.27 | 0.43 | 1.10 | — | 0.159 | 0.067 | 0.024 | 0.0044 | 1.59 | 0.226 |
| A2 | 0.38 | 1.75 | 0.16 | 0.012 | 0.007 | 0.21 | 0.51 | 1.07 | — | 0.167 | 0.066 | 0.020 | 0.0048 | 2.43 | 0.233 |
| A3 | 0.36 | 1.71 | 0.15 | 0.009 | 0.008 | 0.21 | 0.47 | 1.04 | — | 0.156 | 0.063 | 0.020 | 0.0045 | 2.24 | 0.219 |
| A4 | 0.47 | 1.75 | 0.18 | 0.002 | 0.006 | 0.27 | 0.49 | 1.14 | — | 0.159 | 0.073 | 0.017 | 0.0023 | 1.81 | 0.232 |
| A5 | 0.43 | 1.69 | 0.18 | 0.005 | 0.004 | 0.25 | 0.41 | 1.01 | 0.05 | 0.151 | 0.070 | 0.023 | 0.0042 | 1.64 | 0.221 |

TABLE 1-continued

| Steel | Chemical composition (in mass percent) with the remainder being iron and inevitable impurities | | | | | | | | | | | | | | |
|---|---|---|---|---|---|---|---|---|---|---|---|---|---|---|---|
| number | C | Si | Mn | P | S | Cu | Ni | Cr | Mo | V | Ti | Al | N | Ni/Cu | Ti + V |
| A6 | 0.47 | 1.98 | 0.76 | 0.006 | 0.003 | 0.17 | 0.29 | 0.19 | — | 0.144 | 0.080 | 0.021 | 0.0055 | 1.71 | 0.224 |
| A7 | 0.42 | 2.12 | 1.04 | 0.011 | 0.005 | 0.23 | 0.26 | 0.41 | — | — | 0.089 | 0.021 | 0.0055 | 1.13 | 0.089 |
| A8 | 0.33 | 1.12 | 0.15 | 0.010 | 0.010 | 0.13 | 0.25 | 0.75 | 0.07 | 0.175 | 0.058 | 0.025 | 0.0049 | 1.92 | 0.233 |
| A9 | 0.44 | 1.99 | 0.45 | 0.006 | 0.003 | 0.20 | 0.25 | 0.64 | — | — | 0.105 | 0.020 | 0.0041 | 1.25 | 0.105 |
| E1 | 0.35 | 0.19 | 0.66 | 0.010 | 0.009 | 0.01 | 0.03 | 1.04 | 0.17 | 0.009 | 0.006 | 0.026 | 0.0034 | 3.00 | 0.015 |
| E2 | 0.39 | 0.05 | 0.45 | 0.005 | 0.005 | 0.01 | 0.55 | 1.00 | 1.00 | 0.070 | 0.050 | 0.038 | 0.0051 | 55.00 | 0.120 |
| E3 | 0.27 | 1.78 | 0.16 | 0.002 | 0.006 | 0.29 | 0.47 | 1.12 | — | 0.157 | 0.072 | 0.019 | 0.0033 | 1.62 | 0.229 |
| E4 | 0.39 | 0.11 | 0.18 | 0.008 | 0.011 | 0.26 | 0.47 | 1.11 | — | 0.166 | 0.061 | 0.023 | 0.0030 | 1.81 | 0.227 |
| E5 | 0.38 | 1.75 | 0.04 | 0.005 | 0.013 | 0.24 | 0.39 | 1.12 | — | 0.168 | 0.070 | 0.022 | 0.0034 | 1.63 | 0.238 |
| E6 | 0.37 | 1.73 | 1.55 | 0.003 | 0.006 | 0.25 | 0.46 | 1.07 | — | 0.164 | 0.071 | 0.023 | 0.0045 | 1.84 | 0.235 |
| E7 | 0.32 | 1.73 | 0.15 | 0.003 | 0.006 | 0.03 | 0.46 | 1.09 | — | 0.162 | 0.072 | 0.026 | 0.0036 | 15.33 | 0.234 |
| E8 | 0.37 | 1.77 | 0.16 | 0.001 | 0.006 | 0.53 | 0.40 | 1.08 | — | 0.156 | 0.073 | 0.019 | 0.0030 | 0.85 | 0.229 |
| E9 | 0.38 | 1.76 | 0.15 | 0.001 | 0.006 | 0.40 | 0.12 | 1.10 | — | 0.166 | 0.075 | 0.022 | 0.0038 | 0.30 | 0.241 |
| E10 | 0.37 | 1.74 | 0.16 | 0.005 | 0.006 | 0.28 | 0.42 | 0.05 | — | 0.165 | 0.069 | 0.025 | 0.0038 | 1.50 | 0.234 |
| E11 | 0.37 | 1.75 | 0.15 | 0.002 | 0.006 | 0.29 | 0.45 | 2.46 | — | 0.157 | 0.072 | 0.024 | 0.0042 | 1.55 | 0.229 |
| E12 | 0.38 | 1.74 | 0.16 | 0.005 | 0.005 | 0.27 | 0.45 | 1.09 | — | 0.231 | 0.052 | 0.026 | 0.0045 | 1.67 | 0.283 |
| E13 | 0.38 | 1.75 | 0.17 | 0.006 | 0.006 | 0.26 | 0.44 | 1.12 | — | 0.165 | 0.185 | 0.021 | 0.0047 | 1.69 | 0.350 |
| E14 | 0.38 | 1.75 | 0.16 | 0.006 | 0.004 | 0.25 | 0.45 | 1.05 | — | 0.165 | 0.065 | 0.200 | 0.0055 | 1.80 | 0.230 |
| E15 | 0.38 | 1.74 | 0.17 | 0.005 | 0.006 | 0.27 | 0.46 | 1.11 | — | 0.166 | 0.067 | 0.004 | 0.0170 | 1.70 | 0.233 |

The bolts after quenching-tempering were examined on measurements of shank austenite grain size, tensile strength, and yield ratio; observation of carbide particles formed at the austenite grain boundaries; measurement of hydrogen diffusion coefficient; and evaluation of hydrogen embrittlement resistance by procedures as follows.

(1) Austenite Grain Size Measurement

The shank of a sample bolt was cut in a transverse section, where the "transvers section" refers to a cross section perpendicular to the shank. An arbitrary region of 0.039 mm$^2$ of the section at a position (D/4) of one-fourth the shank diameter D was observed with an optical microscope at 400-fold magnification, and a grain size number was measured according to Japanese Industrial Standard (JIS) G0551. Measurements were performed in four fields of view, the measured values were averaged, and the average was defined as the austenite grain size.

(2) Tensile Strength and Yield Ratio Measurement

The tensile strength of a sample bolt was determined by performing a tensile test according to JIS B1051. The yield ratio was determined by measuring a 0.2% yield strength and dividing the same by the tensile strength.

(3) Observation of Carbide Particles Precipitated at Austenite Grain Boundary

Samples having a tensile strength of 1400 MPa or more and a yield ratio of 0.90 or more as determined by the tensile test were subjected to observation of carbide particles formed at austenite grain boundaries. Test Nos. 15 and 19 in Table 3 were samples each having a tensile strength of less than 1400 MPa, but were subjected to observation of carbide particles formed at the austenite grain boundaries.

The carbide particles formed at the austenite grain boundaries were observed in the following manner. The bolt shank was cut in a transverse section, from which a thin-film test specimen was prepared using focused-ion-beam-milling instrument (FIB: Focused Ion Beam Process FB-2000A supplied by Hitachi, Ltd). Three images of an austenite grain boundaries were taken per one sample with a transmission electron microscope (JEMS-2100F supplied by Hitachi, Ltd.) at 150000-fold magnification. The images were analyzed to calculate a length and a thickness of a carbide particle formed at the grain boundaries, where the thickness herein is a dimension in a direction perpendicular to the austenite grain boundary. The length (L; total length) of carbide particles formed at the austenite grain boundaries and having a thickness of 50 nm or more was divided by the length (L0) of austenite grain boundaries and was indicated in percentage. This was defined as a percentage of carbide particles on the austenite grain boundaries (G-value). The G-values obtained in the three images were averaged and are indicated in Tables 2 and 3. Herein L0 is the total sum of lengths of all austenite grain boundaries included in one image; and L is the total sum of lengths of all "carbide particles formed at austenite grain boundaries and each having a thickness of 50 nm or more" included in the image.

(4) Hydrogen Diffusion Coefficient Measurement

The hydrogen diffusion coefficient was measured by cutting the bolt shank in a transverse section, mechanically polishing the cut surface, electrolytically polishing the surface into a thin sheet specimen having a thickness of 0.1 mm, and subjecting the specimen to an electrochemical hydrogen permeation test. Specifically, both sides of the sheet specimen were defined as hydrogen evolution/hydrogen abstraction surfaces, and the rate (change with time) for hydrogen atom formed by electrolysis of an acid solution to permeate the sheet specimen was evaluated. A permeated hydrogen flux was detected by an oxidation current measurement of the hydrogen abstraction surface in an alkaline solution. The test was performed at room temperature. Respective process curves of from hydrogen evolution to stationary permeation (Build Up) and from hydrogen evolution termination to hydrogen permeation termination (Decay) were obtained three times. The diffusion coefficient was determined by performing curve fitting of the measurement results with respect to the theoretical solution of diffusion equation. A total of six measurement results including three measurement results in Build Up and Decay, respectively, was averaged and defined as the hydrogen diffusion coefficient. Solutions used in the testing, electrolysis condition, and testing area are as follows:

Testing Solution
Hydrogen detection: 1 N—NaOH
Hydrogen evolution: 0.5 mol/L $H_2SO_4$+0.01 mol/L KSCN Electrolysis Conditions
Hydrogen detection side: 150 mV vs Ag/AgCl
Hydrogen evolution side: Build Up 5 mA/cm$^2$, Decay 1 mA/cm$^2$ Testing area: 0.18 cm$^2$ (5) Hydrogen Embrittlement Resistance Evaluation The hydrogen embrittlement resistance was evaluated in the following manner. A notch was formed in the bolt shank by machining so as to give a stress concentration factor of 3. A constant load of 1500 MPa was applied with respect to the surface area of the notch bottom and, immediately thereafter, cathodic charge was performed on the notch. The testing was performed at room temperature (25° C.) during first three hours, but was performed at 50° C. during next three hours by heating the solution with a heater. The testing was continued thereafter while repeating a cycle of at room temperature for three hours and at 50° C. for three hours.

The time until the sample broke was measured and evaluated as the result. The testing was aborted at 120 hours into the testing when the sample did not break. The time (hours) to rupture was divided by 120, and this was defined as the hydrogen embrittlement resistance level as a testing result. A sample having a hydrogen embrittlement resistance level of 0.60 or more was evaluated as having excellent hydrogen embrittlement resistance. A testing solution and testing condition are as follows:

Testing Solution: pH 3-$H_2SO_4$+0.01 mol/L KSCN
Testing Current Density 0.01 mA/$cm^2$
The results are indicated in Tables 2 and 3.

TABLE 2

| Test number | Steel number | Reheating temperature (° C.) | Finish rolling temperature (° C.) | Quenching temperature (° C.) | Temperature T (° C.) | Tempering temperature (° C.) | Austenite grain size number | G-value (%) |
|---|---|---|---|---|---|---|---|---|
| 1 | A1 | 1100 | 930 | 910 | 519 | 500 | 10.8 | 41.2 |
| 2 | A1 | 1100 | 930 | 910 | 519 | 450 | 10.8 | 25.8 |
| 3 | A1 | 1100 | 930 | 910 | 519 | 400 | 10.8 | 8.1 |
| 4 | A2 | 1100 | 930 | 910 | 518 | 450 | 10.5 | 24.1 |
| 5 | A2 | 1100 | 930 | 910 | 518 | 400 | 10.5 | 7.7 |
| 6 | A3 | 1100 | 930 | 910 | 517 | 425 | 10.4 | 15.9 |
| 7 | A4 | 1100 | 930 | 910 | 518 | 490 | 10.5 | 52.3 |
| 8 | A5 | 1100 | 930 | 910 | 516 | 450 | 10.2 | 22.4 |
| 9 | A6 | 1050 | 900 | 910 | 527 | 450 | 10.2 | 29.9 |
| 10 | A7 | 1100 | 930 | 910 | 531 | 430 | 9.2 | 27.8 |
| 11 | A8 | 1050 | 980 | 910 | 488 | 430 | 9.2 | 47.1 |
| 12 | A9 | 1100 | 930 | 910 | 527 | 430 | 9.4 | 18.9 |

| Test number | Tensile strength (MPa) | Yield ratio | Hydrogen diffusion coefficient* ($cm^2$/s) | Hydrogen embrittlement resistance level | Bolt Headability | Mechanical properties | Hydrogen embrittlement resistance |
|---|---|---|---|---|---|---|---|
| 1 | 1423 | 0.96 | 8.03E−07 | 0.65 | ○ | ○ | ○ |
| 2 | 1547 | 0.94 | 3.84E−07 | 0.79 | ○ | ○ | ○ |
| 3 | 1754 | 0.93 | 3.71E−07 | 1.00 | ○ | ○ | ○ |
| 4 | 1522 | 0.94 | 7.18E−07 | 0.77 | ○ | ○ | ○ |
| 5 | 1730 | 0.94 | 3.14E−07 | 0.91 | ○ | ○ | ○ |
| 6 | 1641 | 0.93 | 4.43E−07 | 0.80 | ○ | ○ | ○ |
| 7 | 1438 | 0.94 | 9.41E−07 | 0.64 | ○ | ○ | ○ |
| 8 | 1598 | 0.96 | 5.59E−07 | 1.00 | ○ | ○ | ○ |
| 9 | 1583 | 0.94 | 7.31E−07 | 0.71 | ○ | ○ | ○ |
| 10 | 1556 | 0.92 | 8.21E−07 | 0.75 | ○ | ○ | ○ |
| 11 | 1415 | 0.90 | 8.51E−07 | 0.64 | ○ | ○ | ○ |
| 12 | 2043 | 0.93 | 5.59E−07 | 0.89 | ○ | ○ | ○ |

*"AE−0B" refers to "A×$10^{-B}$"

TABLE 3

| Test number | Steel number | Reheating temperature (° C.) | Finish rolling temperature (° C.) | Quenching temperature (° C.) | Temperature T (° C.) | Tempering temperature (° C.) | Austenite grain size number | G-value (%) |
|---|---|---|---|---|---|---|---|---|
| 13 | A1 | 980 | 900 | — | 519 | — | — | — |
| 14 | A1 | 1100 | 930 | 910 | 519 | 350 | 10.4 | — |
| 15 | A1 | 1100 | 930 | 910 | 519 | 580 | 10.4 | 79.7 |
| 16 | A5 | 1100 | 930 | 910 | 516 | 530 | 10.2 | 65.8 |
| 17 | A7 | 1100 | 930 | 910 | 531 | 540 | 9.5 | 64.8 |
| 18 | A9 | 1100 | 930 | 910 | 527 | 550 | 9.4 | 69.5 |
| 19 | E1 | 1150 | 900 | 890 | 367 | 480 | 7.5 | 92.5 |
| 20 | E2 | 1200 | 900 | 910 | 276 | 580 | 10.0 | 78.9 |
| 21 | E2 | 1200 | 900 | 910 | 276 | 400 | 10.0 | 61.4 |
| 22 | E3 | 1100 | 930 | 910 | 519 | 400 | 10.5 | — |
| 23 | E4 | 1100 | 930 | 910 | 329 | 400 | 10.4 | 62.3 |
| 24 | E5 | 1100 | 930 | 910 | 518 | 425 | 10.5 | 21.5 |
| 25 | E6 | 1100 | 930 | 910 | 517 | 475 | 10.5 | 40.3 |
| 26 | E7 | 1100 | 930 | 910 | 517 | 400 | 10.5 | — |
| 27 | E8 | 1100 | 950 | — | 519 | — | — | — |
| 28 | E9 | 1100 | 950 | 925 | 519 | 450 | 10.5 | 29.8 |
| 29 | E10 | 1100 | 930 | — | 518 | — | — | — |

TABLE 3-continued

| | | | | | | | | |
|---|---|---|---|---|---|---|---|---|
| 30 | E11 | 1100 | 930 | 925 | 518 | 500 | 10.5 | 49.2 |
| 31 | E12 | 1100 | 930 | — | 518 | — | — | — |
| 32 | E13 | 1150 | 900 | 950 | 518 | 450 | 11.5 | 29.8 |
| 33 | E14 | 1100 | 950 | 950 | 518 | 500 | 8.0 | 49.2 |
| 34 | E15 | 1100 | 950 | — | 518 | — | — | — |

| Test number | Tensile strength (MPa) | Yield ratio | Hydrogen diffusion coefficient* ($cm^2/s$) | Hydrogen embrittlement resistance level | Results Bolt Headability | Mechanical properties | Hydrogen embrittlement resistance |
|---|---|---|---|---|---|---|---|
| 13 | — | — | — | — | X | X | X |
| 14 | 1976 | 0.85 | — | — | ○ | X | — |
| 15 | 1325 | 0.97 | 1.36E−06 | 0.38 | ○ | ○ | X |
| 16 | 1421 | 0.97 | 1.02E−06 | 0.52 | ○ | ○ | X |
| 17 | 1431 | 0.96 | 1.21E−06 | 0.55 | ○ | ○ | X |
| 18 | 1538 | 0.97 | 1.21E−06 | 0.52 | ○ | ○ | X |
| 19 | 1211 | 0.94 | — | — | ○ | X | X |
| 20 | 1417 | 0.93 | 1.23E−06 | 0.35 | ○ | ○ | X |
| 21 | 1600 | 0.92 | 1.09E−06 | 0.55 | ○ | ○ | X |
| 22 | 1396 | 0.91 | — | — | ○ | X | — |
| 23 | 1557 | 0.90 | 2.10E−06 | 0.43 | ○ | ○ | X |
| 24 | 1662 | 0.91 | 4.97E−07 | 0.41 | ○ | ○ | X |
| 25 | 1531 | 0.92 | 7.75E−07 | 0.22 | ○ | ○ | X |
| 26 | 1383 | 0.91 | — | — | ○ | X | — |
| 27 | — | — | — | — | X | — | — |
| 28 | 1610 | 0.93 | 6.20E−07 | 0.14 | ○ | ○ | X |
| 29 | — | — | — | — | X | — | — |
| 30 | 1480 | 0.94 | 9.07E−07 | 0.39 | ○ | ○ | X |
| 31 | — | — | — | — | X | — | — |
| 32 | 1564 | 0.93 | 6.20E−07 | 0.53 | ○ | ○ | X |
| 33 | 1612 | 0.91 | 9.07E−07 | 0.41 | ○ | ○ | X |
| 34 | — | — | — | — | X | — | — |

*"AE−0B" refers to "A×$10^{−B}$"

Tables 1 to 3 indicate as follows. Numbers hereinafter refer to "Test number" given in Tables 2 and 3. Specifically, samples of Nos. 1 to 12 had appropriately controlled steel chemical compositions and manufactured under appropriately controlled conditions. The samples each successfully had a high strength of 1400 MPa or more and still exhibited excellent hydrogen embrittlement resistance.

In contrast, samples of Nos. 13 to 34 were inappropriate at least one of the steel chemical composition and manufacturing condition and thereby had an insufficient strength and/or inferior hydrogen embrittlement resistance.

No. 13 was a sample undergoing reheating at an excessively low temperature and had poor bolt headability. This is because coarse carbonitride particles typically of Cr, Ti, and V remained in the steel and caused insufficient spheroidization in the downstream step.

No. 14 was a sample undergoing tempering at a temperature lower than 400° C., thereby had a low yield ratio, and failed to have satisfactory properties as a bolt.

Nos. 15 to 18 were samples each undergoing tempering at a temperature higher than the temperature T and exhibited poor hydrogen embrittlement resistance. This is because large amounts of carbide particles were formed at the grain boundaries to degrade the grain boundary strength.

Nos. 19 to 21 were samples containing added elements, two or more of which did not meet the conditions specified in the present invention, and did not meet all the criteria for tensile strength, yield ratio, and hydrogen embrittlement resistance. No. 19 was a sample using SCM 435 steel as prescribed in JIS, had an insufficient Si content, thereby had a temperature T lower than 400° C., and failed to have a yield ratio and hydrogen embrittlement resistance both at satisfactory levels. No. 19 underwent tempering at 480° C., but had a tensile strength of less than 1400 MPa.

Nos. 20 and 21 had high Mo contents and would be capable of ensuring a tensile strength and a yield ratio at certain levels due to hardening activity of Mo, even though undergoing tempering at a high temperature. However, Nos. 20 and 21 had insufficient Si contents, thereby had temperatures T lower than 400° C., and failed to have a yield ratio and hydrogen embrittlement resistance both at satisfactory levels. Nos. 20 and 21 underwent tempering at 580° C. and 400° C., respectively, and each had inferior hydrogen embrittlement resistance due to large amounts of carbide particles formed at the austenite grain boundaries.

No. 22 was a sample containing carbon in an excessively low content and had a tensile strength of less than 1400 MPa even undergoing tempering at 400° C.

No. 23 was a sample containing Si in an excessively low content, thereby had a temperature T of lower than 400° C., and failed to have a yield strength and hydrogen embrittlement resistance both at satisfactory levels. The sample underwent tempering at 400° C., but failed to have satisfactory hydrogen embrittlement resistance. This is because a large number of carbide particles were formed at the austenite grain boundaries.

No. 24 was a sample containing Mn in an excessively low content; whereas No. 25 is a sample containing Mn in an excessively high content. No. 24 had inferior hydrogen embrittlement resistance, because FeS was formed in part of the grain boundaries and degraded the grain boundary strength. No. 25 had inferior hydrogen embrittlement resistance, because MnS segregated at the grain boundaries and thereby degrade the grain boundary strength.

No. 26 was a sample containing Cu in an excessively low content; whereas No. 27 was a sample containing Cu in an excessively high content. No. 26 had a tensile strength of less than 1400 MPa even undergoing tempering at 400° C.

and failed to have a tensile strength and a yield ratio both at satisfactory levels. No. 27 exhibited inferior bolt headability due to inferior toughness.

No. 28 was a sample having a small ratio Ni/Cu and had inferior hydrogen embrittlement resistance. This is probably because hot brittleness occurred during continuous casting to cause micro-cracking and other defects to remain in the steel.

No. 29 was a sample containing Cr in an excessively low content; whereas No. 30 was a sample containing Cr in an excessively high content. No. 29 exhibited inferior bolt headability because spheroidization before bolt heading was insufficient. No. 30 had inferior hydrogen embrittlement resistance because coarse carbonitride particles were formed after tempering to degrade the toughness.

No. 31 was a sample containing V in an excessively high content and failed to undergo bolt heading. This is because coarse vanadium carbonitride particles were formed to degrade the bolt headability.

No. 32 was a sample containing V and Ti in an excessively high total content and had inferior hydrogen embrittlement resistance. This is probably because large amounts of hydrogen trapping sites were formed as a result of tempering, hydrogen was fixed in a large amount in the trapping sites, and the trapped hydrogen was released upon temperature changes during the testing.

No. 33 was a sample containing Al in an excessively high content and had inferior hydrogen embrittlement resistance. This is because coarse AlN particles were formed, which caused grains to coarsen during quenching and thereby caused the sample to have inferior toughness.

No. 34 was a sample containing N in an excessively high content and exhibited inferior bolt headability. This is because a larger amount of nitrogen was dissolved as a solute in the steel.

FIG. 1 is a graph illustrating how the hydrogen embrittlement resistance level (evaluation result of hydrogen embrittlement resistance) varies depending on the G-value. The graph is plotted based on the results obtained in Experimental Example 1. FIG. 1 demonstrates that the hydrogen embrittlement resistance level (evaluation result of hydrogen embrittlement resistance) has a correlation to the G-value; the hydrogen embrittlement resistance level increases with a decreasing G-value; and that the G-value is preferably 60 or less so as to give a hydrogen embrittlement resistance level of 0.60 or more.

Figure 2:
FIG. 2 depict photographs of the austenite grain boundaries of a steel according to the embodiment of the present invention and a steel as a comparative example (comparative steel).
Figure 2:
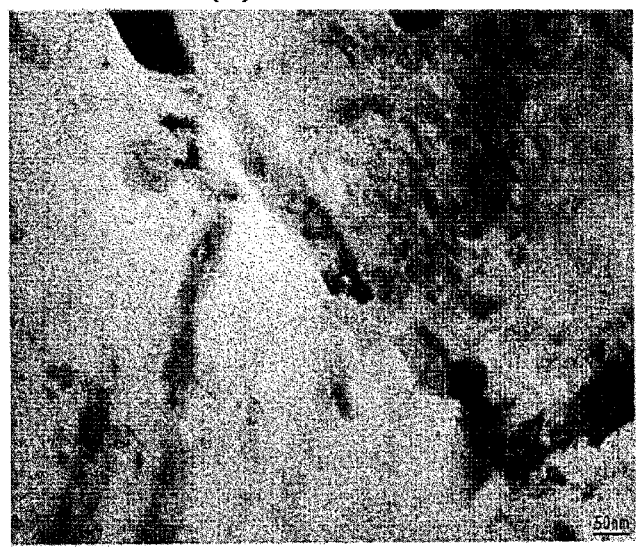

FIG. 2 depicts photographs of austenite grain boundaries of Test No. 1 and Test No. 20, respectively. Comparisons between the photographs of Test No. 1 and Test No. 20 demonstrate that a lager amount of carbide particles was formed at the grain boundaries in Test No. 20 than in Test No. 1.

Experimental Example 2

Hydrogen embrittlement resistance in a corrosive environment was examined in Experimental Example 2, the results of which will be described below.

Steels having chemical compositions given in Table 4 (with the remainder being iron and inevitable impurities) were made by a common ingot-making technique. The steels were cast, hot-rolled, and yielded rolled steels having a diameter of 14 mm. All samples in Experimental Example 2 were prepared at a reheating temperature of 1050° C. or higher and a finish rolling temperature of 1000° C. or lower. Delayed fracture test specimens and tensile test specimens were sampled from the rolled steels and subjected to quenching and tempering under conditions given in Tables 5 and 6. Other quenching-tempering conditions are as follows: quenching heating time of 30 minutes; quenching in-furnace atmosphere of $N_2$; quenching cooling condition of oil cooling (70° C.); tempering time of one hour; and tempering cooling condition of air cooling. The atmosphere was controlled in a procedure as follows when quenching and tempering were performed in an in-furnace atmosphere of $N_2$. Initially, the inside (air at $1.013 \times 10^5$ Pa) of a cylindrical furnace having a diameter of 400 mm and a length of 400 mm was evacuated to 0.4 Pa with a rotary pump. The inside atmosphere was then purged with nitrogen ($N_2$) gas at $1.013 \times 10^5$ Pa. Assuming that the air has an oxygen content of about 21 percent by volume, it is calculated that the $N_2$ atmosphere after nitrogen purge has an oxygen content of $0.4/(1.013 \times 10^5) \times 0.21 = 0.8 \times 10^{-6}$, i.e., 0.8 ppm (by volume).

TABLE 4

| Steel number | Chemical composition (in mass percent) with the remainder being iron and inevitable impurities | | | | | | | | | | | | | | | |
| --- | --- | --- | --- | --- | --- | --- | --- | --- | --- | --- | --- | --- | --- | --- | --- |
| | C | Si | Mn | P | S | Cu | Ni | Cr | Mo | V | Ti | Al | N | Ni/Cu | Ti + V |
| D1 | 0.39 | 1.75 | 0.16 | 0.005 | 0.004 | 0.27 | 0.43 | 1.07 | — | 0.167 | 0.066 | 0.020 | 0.0048 | 1.59 | 0.233 |
| D2 | 0.36 | 1.76 | 0.18 | 0.004 | 0.002 | 0.27 | 0.43 | 1.10 | — | 0.159 | 0.066 | 0.024 | 0.0037 | 1.69 | 0.225 |
| D3 | 0.42 | 2.12 | 1.04 | 0.011 | 0.005 | 0.23 | 0.26 | 0.41 | — | — | 0.089 | 0.021 | 0.0055 | 1.13 | 0.089 |
| D4 | 0.47 | 1.98 | 0.76 | 0.006 | 0.003 | 0.17 | 0.29 | 0.19 | — | 0.144 | 0.080 | 0.019 | 0.0032 | 1.71 | 0.224 |
| D5 | 0.38 | 1.74 | 0.15 | 0.004 | 0.004 | 0.24 | 0.41 | 1.05 | 0.04 | 0.167 | 0.066 | 0.020 | 0.0048 | 1.71 | 0.233 |
| C1 | 0.35 | 0.19 | 0.66 | 0.010 | 0.009 | 0.01 | 0.03 | 1.04 | 0.17 | 0.009 | 0.006 | 0.026 | 0.0034 | 3.00 | 0.015 |
| C2 | 0.54 | 1.39 | 0.72 | 0.005 | 0.005 | 0.01 | 0.02 | 0.68 | — | 0.009 | 0.003 | 0.002 | 0.0038 | 2.00 | 0.012 |
| C3 | 0.60 | 1.91 | 0.95 | 0.013 | 0.003 | — | 0.01 | 0.17 | — | 0.003 | 0.008 | 0.024 | 0.0034 | — | 0.011 |
| C4 | 0.39 | 0.05 | 0.45 | 0.005 | 0.005 | 0.01 | 0.55 | 1.00 | 1.00 | 0.070 | 0.050 | 0.038 | 0.0051 | 55.00 | 0.120 |
| C5 | 0.37 | 1.74 | 0.15 | 0.005 | 0.004 | 0.05 | 0.21 | 1.09 | — | 0.164 | 0.066 | 0.023 | 0.0045 | 4.20 | 0.230 |
| C6 | 0.37 | 1.77 | 0.16 | 0.001 | 0.006 | 0.53 | 0.40 | 1.08 | — | 0.156 | 0.073 | 0.020 | 0.0041 | 0.75 | 0.229 |
| C7 | 0.38 | 1.76 | 0.15 | 0.001 | 0.006 | 0.40 | 0.12 | 1.10 | — | 0.166 | 0.075 | 0.022 | 0.0038 | 0.30 | 0.241 |
| C8 | 0.36 | 0.21 | 0.17 | 0.004 | 0.002 | 0.27 | 0.43 | 1.10 | — | 0.161 | 0.066 | 0.024 | 0.0041 | 1.59 | 0.227 |
| C9 | 0.55 | 1.65 | 0.18 | 0.002 | 0.006 | 0.27 | 0.49 | 1.14 | — | 0.159 | 0.073 | 0.017 | 0.0030 | 1.81 | 0.232 |
| C10 | 0.38 | 1.75 | 0.04 | 0.005 | 0.013 | 0.24 | 0.39 | 1.12 | — | 0.168 | 0.070 | 0.022 | 0.0034 | 1.63 | 0.238 |
| C11 | 0.37 | 1.75 | 2.00 | 0.005 | 0.006 | 0.25 | 0.38 | 1.10 | — | 0.165 | 0.072 | 0.023 | 0.0035 | 1.52 | 0.237 |
| C12 | 0.37 | 1.74 | 0.16 | 0.005 | 0.006 | 0.28 | 0.42 | 0.05 | — | 0.165 | 0.069 | 0.025 | 0.0038 | 1.50 | 0.234 |
| C13 | 0.37 | 1.75 | 0.15 | 0.002 | 0.006 | 0.29 | 0.45 | 2.46 | — | 0.157 | 0.072 | 0.024 | 0.0042 | 1.55 | 0.229 |
| C14 | 0.38 | 1.75 | 0.16 | 0.006 | 0.004 | 0.25 | 0.45 | 1.05 | — | 0.165 | 0.065 | 0.200 | 0.0055 | 1.80 | 0.230 |
| C15 | 0.38 | 1.74 | 0.17 | 0.005 | 0.006 | 0.27 | 0.46 | 1.11 | — | 0.166 | 0.067 | 0.004 | 0.0170 | 1.70 | 0.233 |

(1) Austenite Grain Size Measurement

A tensile test specimen (JIS No. 14A) was sampled from each sample, cut in a section (transverse section) perpendicular to the longitudinal direction of the test specimen, an arbitrary region of 0.039 mm$^2$ in the section at a position (D/4) of one-fourth the shank diameter D was observed with an optical microscope at 400-fold magnification, and a grain size number was measured according to JIS G0551. The measurements were performed in four fields of view, and the measured values were averaged and defined as the austenite grain size.

(2) Tensile Strength and Hardness Measurement

The tensile strength was measured by a tensile test on a tensile test specimen (JIS No. 14A) according to JIS Z2241 mentioned above. A hardness of the same region as in the austenite grain size measurement was measured with a Vickers hardness meter at a load of 10 kg. The measurements were performed at four points, and the measured values were averaged and defined as the bolt shank hardness.

(3) Surface Oxide Layer Analysis

The shank surface oxide layer was analyzed in the following manner. The test specimen was cut in a transverse section (section perpendicular to the shank center) and embedded in a resin. Initially, the overall surface of the embedded specimen was observed with a field emission scanning electron microscope (S-4500 supplied by Hitachi, Ltd.) at 500-fold magnification to verify that the shank after the heat treatment had no uncommon part and did not undergo formation of an oxide layer having a thickness of greater than 100 nm. The specimen was then checked with a transmission electron microscope (JEMS-2100F supplied by Hitachi, Ltd.) at 300000-fold magnification and at 1500000-fold magnification, from which photographic images were taken at two points on a 90° basis at 1500000-fold magnification. The surface area of surface oxide layer was calculated based on image analysis. The calculated surface area of oxide layer was divided by the length of matrix iron layer directly below the oxide layer to give an average thickness of the oxide layer. The average thicknesses of the two points were averaged. In addition, an EDX analysis was performed, and elements contained in the oxide layer were analyzed to determine the oxide layer chemical composition. Samples indicated with "○" in "Presence of Si and Cu" in Tables 5 and 6 contained Si and Cu in such contents that spectra assigned to Si and Cu could be clearly distinguished from a noise component as determined at an acceleration voltage of 20 kV.

(4) Cold Forgeability Evaluation

In Experimental Example 2, a sample was subjected to following cold compression (cold working) simulating bolt processing to evaluate cold forgeability. Specifically, the rolled steel as a sample was subjected to spheroidizing (by holding at 780° C. for 6 hours and cooling at a cooling rate of 10° C./hour), from which a cold compression test specimen having a diameter of 10 mm and a length of 15 mm was prepared. The cold forgeability of the test specimen was evaluated whether the specimen suffered from cracking or not upon 70% compression (70% working). The cold compression was performed at a strain rate of 10 s$^{-1}$.

(5) Hydrogen Embrittlement Resistance Measurement in Corrosive Environment

Figure 3:
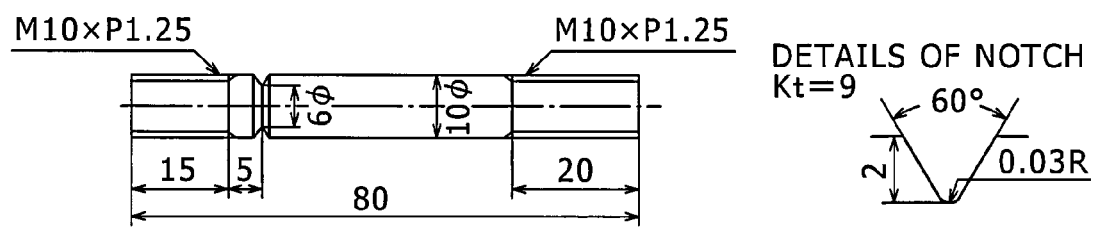
FIG. 3 is a schematic diagram illustrating the shape of a test specimen used in measurement of hydrogen embrittlement resistance in a corrosive environment.

A test specimen having a notch as illustrated in FIG. 3 was prepared and used in the measurement of hydrogen embrittlement resistance in a corrosive environment. The notch was provided so as to simulate stress concentration at a screw thread. The test specimen was immersed in a 15% HCl solution (hydrochloric acid) for 30 minutes, washed with water, dried, and applied with a constant load. A maximum load at which the test specimen did not break for 100 hours or longer was measured. The maximum load at which the test specimen did not break for 100 hours or longer after the acid immersion was divided by the breaking load as determined in the tensile test before the acid immersion, and the resulting value was defined as delayed fracture strength ratio. Based on this, hydrogen embrittlement resistance in a corrosive environment was evaluated. Weights of the test specimen were measured before and after the acid immersion to calculate a change in weight. The change in weight was divided by the weight of the test specimen before the acid immersion and then multiplied by 100. The resulting value was defined as a weight loss on corrosion (%). A sample having a delayed fracture strength ratio of 0.70 or more was evaluated as having excellent hydrogen embrittlement resistance in a corrosive environment.

The results are indicated in Tables 5 and 6.

TABLE 5

| Test number | Steel number | Quenching-tempering conditions | | | Austenite | Surface oxide layer | | Tensile strength rank |
| | | Quenching temperature (° C.) | Tempering temperature (° C.) | Atmosphere | grain size number | Thickness (nm) | Presence of Si and Cu | |
| --- | --- | --- | --- | --- | --- | --- | --- | --- |
| 1 | D1 | 925 | 475 | N$_2$ | 10.0 | 15 | ○ | 15T |
| 2 | | 925 | 455 | N$_2$ | 10.0 | 15 | ○ | 16T |
| 3 | | 925 | 430 | N$_2$ | 10.0 | 12 | ○ | 17T |
| 4 | | 925 | 370 | Air | 10.0 | 220 | ○ | 18T |
| 5 | | 1100 | 370 | N$_2$ | 8.5 | 17 | ○ | 17T |
| 6 | D2 | 930 | 450 | N$_2$ | 10.5 | 16 | ○ | 15T |
| 7 | D3 | 925 | 430 | N$_2$ | 9.0 | 13 | ○ | 15T |
| 8 | D4 | 925 | 480 | N$_2$ | 10.5 | 11 | ○ | 14T |
| 9 | | 925 | 450 | N$_2$ | 10.5 | 11 | ○ | 15T |
| 10 | D5 | 940 | 480 | N$_2$ | 10.5 | 14 | ○ | 15T |
| 11 | C1 | 890 | 480 | N$_2$ | 7.5 | None | Cu not detected | 12T |
| 12 | | 890 | 410 | N$_2$ | 7.5 | None | Cu not detected | 15T |
| 13 | C2 | 925 | 465 | N$_2$ | 7.5 | None | Cu not detected | 15T |
| 14 | C3 | 925 | 460 | N$_2$ | 7.5 | None | Cu not detected | 15T |
| 15 | C4 | 910 | 400 | N$_2$ | 11.0 | 1.5 | Si and Cu not detected | 15T |
| 16 | C5 | 925 | 520 | N$_2$ | 10.0 | 6 | Cu not detected | 15T |
| 17 | C6 | 925 | 530 | N$_2$ | 10.0 | 14 | ○ | 15T |
| 18 | C7 | 925 | 505 | N$_2$ | 10.5 | 13 | ○ | 15T |

TABLE 5-continued

| Test number | Tensile strength (MPa) | Cross-sectional hardness (HV) | Weight loss on corrosion (%) | Delayed fracture strength ratio | Evaluation | | |
|---|---|---|---|---|---|---|---|
| | | | | | Cold forge-ability | Strength | Hydrogen embrittlement resistance in corrosive environment |
| 1 | 1567 | 477 | 0.0106 | 0.90 | ○ | ○ | ○ |
| 2 | 1640 | 492 | 0.0100 | 0.78 | ○ | ○ | ○ |
| 3 | 1725 | 488 | 0.0090 | 0.72 | ○ | ○ | ○ |
| 4 | 1850 | 509 | 0.0361 | 0.55 | ○ | ○ | X |
| 5 | 1700 | 484 | 0.0095 | 0.66 | ○ | ○ | X |
| 6 | 1570 | 478 | 0.0100 | 0.91 | ○ | ○ | ○ |
| 7 | 1556 | 466 | 0.0104 | 0.75 | ○ | ○ | ○ |
| 8 | 1420 | 428 | 0.0121 | 0.79 | ○ | ○ | ○ |
| 9 | 1583 | 475 | 0.0123 | 0.75 | ○ | ○ | ○ |
| 10 | 1570 | 480 | 0.0095 | 0.92 | ○ | ○ | ○ |
| 11 | 1211 | 380 | 0.0326 | 0.88 | ○ | X | ○ |
| 12 | 1570 | 459 | 0.0375 | 0.47 | ○ | ○ | X |
| 13 | 1574 | 465 | 0.1077 | 0.40 | X | ○ | X |
| 14 | 1601 | 473 | 0.0947 | 0.63 | X | ○ | X |
| 15 | 1625 | 483 | 0.0212 | 0.66 | ○ | ○ | X |
| 16 | 1580 | 461 | 0.0318 | 0.67 | ○ | ○ | X |
| 17 | 1595 | 464 | 0.0117 | 0.80 | X | ○ | ○ |
| 18 | 1580 | 480 | 0.0158 | 0.67 | X | ○ | X |

TABLE 6

| Test number | Steel number | Quenching-tempering conditions | | | Austenite grain size number | Surface oxide layer | | Tensile strength rank |
|---|---|---|---|---|---|---|---|---|
| | | Quenching temperature (° C.) | Tempering temperature (° C.) | Atmosphere | | Thickness (nm) | Presence of Si and Cu | |
| 19 | C8 | 930 | 425 | $N_2$ | 10.5 | 8 | Si not detected | 13T |
| 20 | C9 | 925 | 500 | $N_2$ | 10.0 | 12 | ○ | 15T |
| 21 | C10 | 925 | 425 | $N_2$ | 9.5 | 8 | ○ | 15T |
| 22 | C11 | 925 | 575 | $N_2$ | 11.0 | 10 | ○ | 15T |
| 23 | C12 | 925 | 400 | $N_2$ | 10.0 | 1.8 | ○ | 15T |
| 24 | C13 | 925 | 505 | $N_2$ | 10.5 | 17 | ○ | 15T |
| 25 | C14 | 950 | 475 | $N_2$ | 8.0 | 15 | ○ | 15T |
| 26 | C15 | 950 | 475 | $N_2$ | 10.0 | 14 | ○ | 15T |

| Test number | Tensile strength (MPa) | Cross-sectional hardness (HV) | Weight loss on corrosion (%) | Delayed fracture strength ratio | Evaluation | | |
|---|---|---|---|---|---|---|---|
| | | | | | Cold forge-ability | Strength | Hydrogen embrittlement resistance in corrosive environment |
| 19 | 1301 | 392 | 0.0074 | 0.81 | ○ | X | ○ |
| 20 | 1578 | 486 | 0.1023 | 0.54 | X | ○ | X |
| 21 | 1662 | 488 | 0.0291 | 0.58 | X | ○ | X |
| 22 | 1638 | 483 | 0.0424 | 0.42 | ○ | ○ | X |
| 23 | 1560 | 480 | 0.0593 | 0.44 | ○ | ○ | X |
| 24 | 1612 | 477 | 0.0212 | 0.65 | ○ | ○ | X |
| 25 | 1730 | 481 | 0.0198 | 0.60 | ○ | ○ | X |
| 26 | 1640 | 483 | 0.0185 | 0.67 | ○ | ○ | X |

Tables 4 to 6 indicate as follows. Numbers hereinafter refer to "Test number" given in Tables 5 and 6. Specifically, samples of Nos. 1 to 3 and 6 to 10 had appropriate steel chemical compositions and manufactured under appropriately controlled conditions. The samples each had a high strength of 1400 MPa or more and exhibited excellent hydrogen embrittlement resistance in a corrosive environment as having a delayed fracture strength ratio of 0.70 or more.

In contrast, samples of Nos. 4 to 5 and 11 to 26 were inappropriate in at least one of the steel chemical composition and manufacturing conditions and, as a result, had an insufficient strength or inferior hydrogen embrittlement resistance in a corrosive environment.

No. 4 indicates the influence of the tempering atmosphere. The results in No. 4 demonstrate that excellent hydrogen embrittlement resistance in a severe corrosive environment may be exhibited by preparing a bolt that meets the specific condition, i.e., that bears a surface iron oxide layer having a thickness controlled to be 0 to 100 nm; and subjecting the bolt to tempering in an inert gas atmosphere having an oxygen content of 10 ppm (by volume) or less so as to form a specific iron oxide layer in the bolt shank surface.

No. 5 indicates the influence of the heating temperature in quenching. No. 5 underwent heating at an excessively high temperature in quenching and had inferior hydrogen embrittlement resistance in a corrosive environment. This is because the heating caused grains to coarsen and reduced the toughness of the steel.

No. 11 had a chemical composition not meeting the conditions specified in the present invention, thereby had a small grain size number, and had an insufficient strength.

Nos. 12 to 16 had chemical compositions not meeting the conditions specified in the present invention, did not meet the criterion in at least one of grain size, iron oxide layer thickness, and iron oxide layer composition as specified in the present invention, and had inferior hydrogen embrittlement resistance in a corrosive environment.

No. 17 was a sample containing Cu in an excessively high content, suffered from insufficient toughness, and thereby exhibited inferior cold forgeability.

No. 18 was a sample having a low ratio Ni/Cu and had inferior hydrogen embrittlement resistance in a corrosive environment. This is probably because the sample had inferior hot ductility to cause micro-cracking and other defects to remain inside thereof.

No. 19 was a sample containing Si in an excessively low content and failed to have a desired tensile strength even though undergoing tempering at a temperature of 425° C.

No. 20 was a sample containing C in an excessively high content and had inferior hydrogen embrittlement resistance in a corrosive environment. This is because the sample had inferior corrosion resistance to increase the hydrogen supply (hydrogen migration) into the steel and became highly susceptible to delayed fracture. The sample also had inferior cold forgeability.

No. 21 was a sample containing Mn in an excessively low content; whereas No. 22 was a sample containing Mn in an excessively high content. No. 21 had inferior hydrogen embrittlement resistance in a corrosive environment. This is because FeS was formed in part of the grain boundaries and caused the sample to have a low grain boundary strength. The sample also had inferior cold forgeability. No. 22 had inferior hydrogen embrittlement resistance in a corrosive environment. This is because MnS segregated at the grain boundaries and caused the sample to have a low grain boundary strength.

No. 23 was a sample containing Cr in an excessively low content and had inferior hydrogen embrittlement resistance in a corrosive environment. This is because the iron oxide layer had an insufficient thickness and caused the sample to have inferior corrosion resistance.

No. 24 was a sample containing Cr in an excessively high content and had inferior hydrogen embrittlement resistance in a corrosive environment. This is because coarse carbonitride particles were formed after tempering and caused the sample to have inferior toughness.

No. 25 was a sample containing Al in an excessively high content and undergoing quenching at an excessively high temperature and had inferior hydrogen embrittlement resistance in a corrosive environment. This is because coarse aluminum nitride (AlN) particles were formed and acted as a stress concentration point.

No. 26 was a sample containing N in an excessively high content and had inferior hydrogen embrittlement resistance in a corrosive environment. This is because a larger amount of nitrogen was dissolved in the steel.

The invention claimed is:
1. A bolt, comprising: a steel comprising
C in a mass percentage of 0.30% or more and less than 0.45%;
Si in a mass percentage of 1.0% to 2.5%;
Mn in a mass percentage of 0.1% to 1.5%;
P in a mass percentage of greater than 0% to 0.015%;
S in a mass percentage of greater than 0% to 0.015%;
Cr in a mass percentage of 0.15% to 2.4%;
Al in a mass percentage of 0.010% to 0.10%;
N in a mass percentage of 0.001% to 0.10%;
Cu in a mass percentage of 0.1% to 0.50%, and Ni in a mass percentage of 0.1% to 1.0%, so that [Ni]/[Cu]≥0.5 is met, where [Ni] and [Cu] denote the mass percentage of Ni and Cu in the steel, respectively; and
Ti in a mass percentage of 0.05% to 0.2%, and V in a mass percentage of 0% to 0.2%, so that [Ti]+[V] is 0.085% to 0.30%, where [Ti] and [V] denote the mass percentage of Ti and V in the steel respectively; and
iron,
wherein
the bolt has an austenitic grain size number of 9.0 or more in a shank thereof;
the bolt has a G-value meeting a condition as specified by Expression (1) as follows:

$$G\text{-value}=(L/L0)\times 100 \leq 60 \quad (1)$$

where:
the G-value indicates a percentage of carbide particles formed at austenite grain boundaries in the shank,
L denotes a total length of carbide particles formed at the austenite grain boundaries and having a thickness of 50 nm or more; and
L0 denotes a length of the austenite grain boundaries.

2. The bolt according to claim 1, comprising an iron oxide layer containing Si and Cu on a surface of the shank and having a thickness of 2.0 to 100 nm.

3. The bolt according to claim 1, having a tensile strength of 1400 MPa or more.

4. A method for manufacturing the bolt according to claim 1, the method comprising:
heating the steel to a temperature of 1050° C. or higher;
hot-rolling the steel after the heating and performing finish rolling at a temperature of 1000° C. or lower;
forming the bolt; and
treating the bolt in a quenching-tempering process after bolt forming comprising a quenching at a quenching temperature of 860° C. to 930° C. and a tempering at a tempering temperature of 400° C. to T° C., where T is specified by Expression (2) as follows:

$$T(^\circ C.)=68.2 \ln[Si]+480 \quad (2)$$

where Ln denotes a natural logarithm; and [Si] denotes the mass percentage of Si in the steel.

5. The method according to claim 4, wherein:
before tempering, the bolt has an iron oxide layer on a shank surface of 0 to 100 nm thick; and
the tempering is performed in an inert gas atmosphere having an oxygen content of 10 ppm by volume or less.

6. The bolt according to claim 1, wherein the steel further comprises:
Mo in a mass percentage of greater than 0% to 0.1%.

7. The bolt according to claim 1, having a delayed fracture strength ratio of 0.70 or more.

8. The bolt according to claim 1, wherein the G-value is 45% or less.

9. The bolt according to claim 1, wherein the G-value is 35% or less.

10. The bolt according to claim 1, wherein the G-value is 5% or more.

11. The bolt according to claim 1, wherein the austenitic grain size number is 9.5 or more.

12. The bolt according to claim 1, wherein the austenitic grain size number is 10.0 or more.

13. The bolt according to claim 1, wherein the austenitic grain size number is 15 or less.

14. The method according to claim 4, wherein the quenching temperature is 880° C. or higher.

15. The method according to claim 4, wherein the quenching temperature is 890° C. or higher.

16. The method according to claim 4, wherein the quenching temperature is 920° C. or lower.

17. The method according to claim 4, wherein the quenching temperature is 910° C. or lower.

18. The bolt according to claim 1, wherein
the steel does not comprise V and
Ti is present in a mass percentage of 0.085% to 0.2%.

* * * * *